Figure 1:
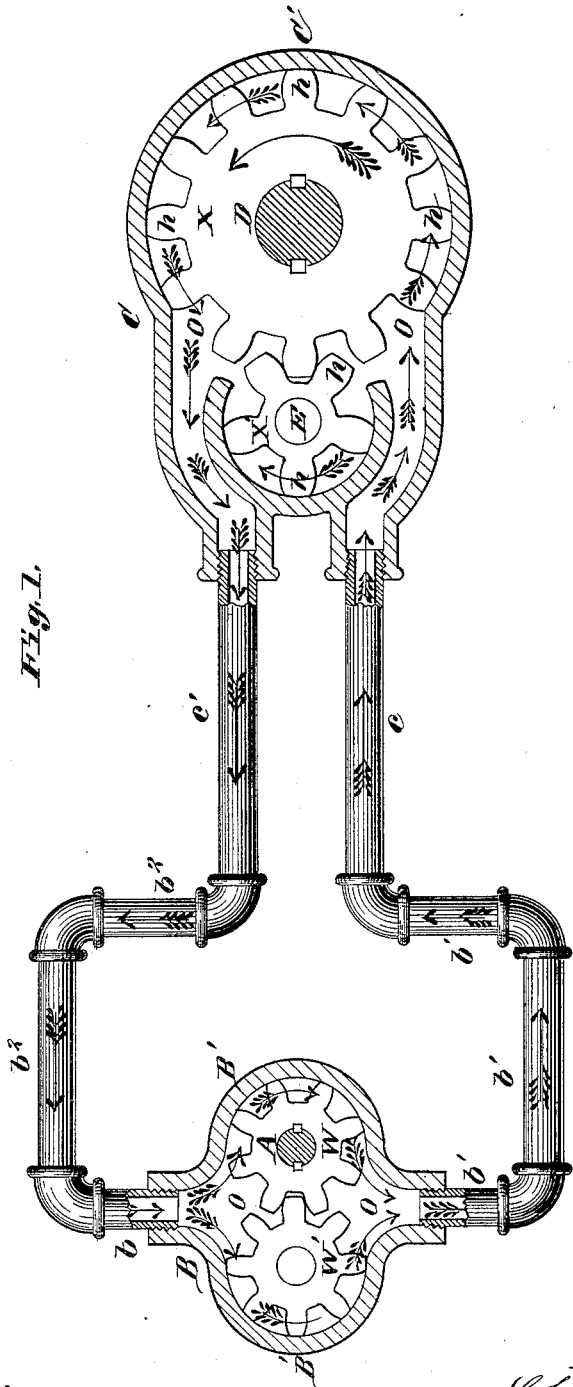

(No Model.) 2 Sheets—Sheet 1.

C. K. PICKLES.
MECHANICAL MOVEMENT.

No. 433,184. Patented July 29, 1890.

Attest:
J. V. Pickles
R. L. Langdeau

Inventor:
Charles K. Pickles

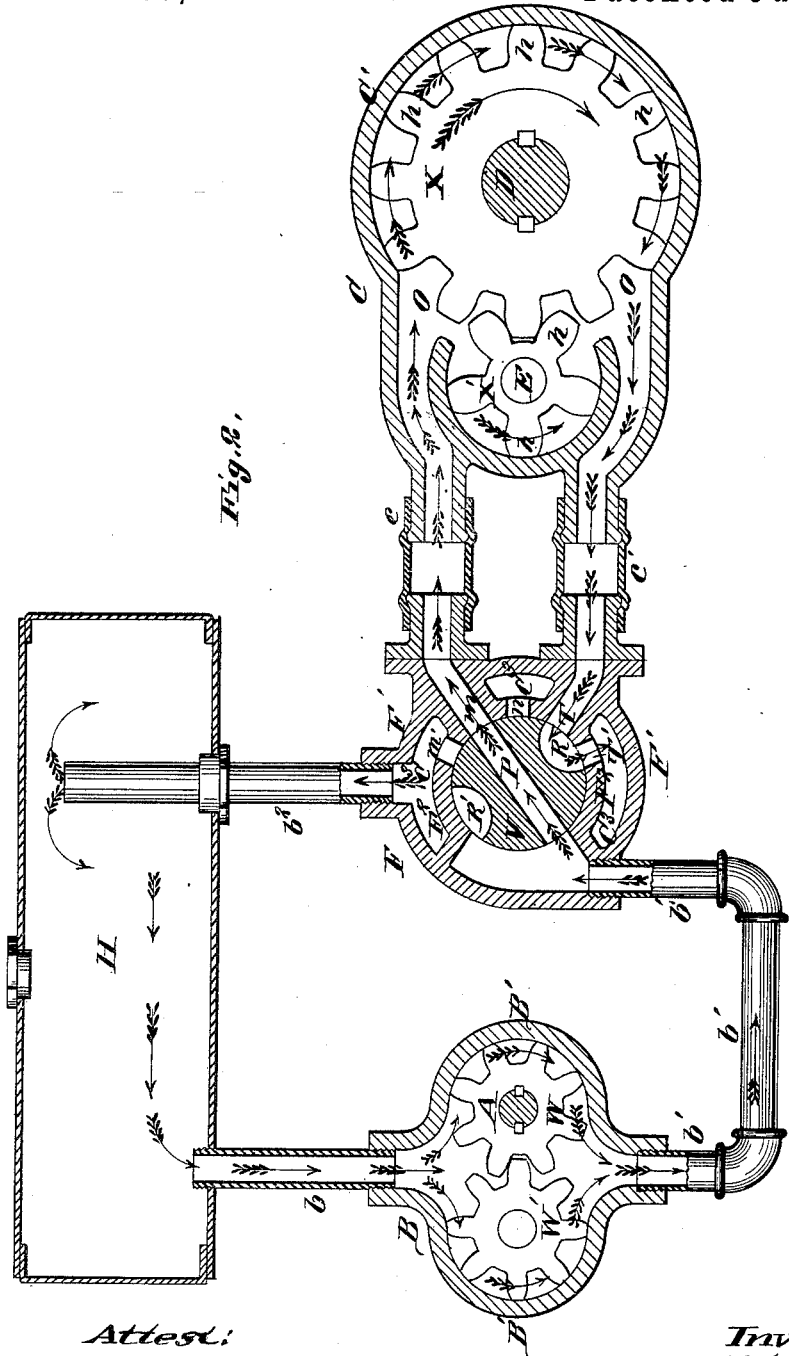

UNITED STATES PATENT OFFICE.

CHARLES K. PICKLES, OF ST. LOUIS, MISSOURI.

MECHANICAL MOVEMENT.

SPECIFICATION forming part of Letters Patent No. 433,184, dated July 29, 1890.

Application filed May 29, 1890. Serial No. 353,518. (No model.)

*To all whom it may concern:*

Be it known that I, CHARLES K. PICKLES, a citizen of the United States, residing at the city of St. Louis, in the State of Missouri, have invented a new and useful Mechanical Movement, of which the following is a specification, reference being had to the annexed drawings, in which similar letters refer to similar parts throughout the same.

Figure 1 is a vertical section of my invention, drawn on a line passing through the center of the mechanism. Fig. 2 is a vertical section of my invention with a reverser attached thereto, drawn on a line passing through the center of the same.

A is a power-shaft journaled in suitable frame-work, said power-shaft being adapted to be revolved by power applied thereto in any suitable manner. This shaft is supplied with a rotary pump B, which, as shown, consists of an outside casing B' and wheels or cylinders W W', which are provided on their peripheries with intermeshing spurs or projections, the wheel W being mounted on the shaft A and adapted to revolve with and secure its power therefrom. W' is a like wheel or cylinder, and is mounted on a shaft and thereby adapted to revolve within the casing B' and with the wheel W. Both of these wheels or cylinders are closely fitted and adapted to move within the casing and intermesh with each other, so that when the wheel W is caused to revolve by the revolution of the shaft A the wheel W' will revolve with it in the direction of that indicated by the arrows on said wheels, and the oil or other fluid will be forced through the casing B' between the wheels and casing in the direction indicated by the arrows, as in any ordinary rotary pump. This casing B' is supplied with an inlet-pipe $b$ and an outlet-pipe $b'$, which communicate each with the interior of said casing and provide for the inlet and outlet of oil to said casing's interior.

C is another rotary pump similarly constructed to the pump B, and is made larger or smaller in capacity, according as the power to be transmitted is to run machinery faster or slower than the shaft A. If the speed is to be increased, the pump C will be made of less capacity in proportion as speed is to be increased, and of greater capacity in proportion as the speed is to be lessened.

The wheels in the pump C are mounted in a similar manner to the wheels in the pump B, one of them $x$ being attached to the power-receiving shaft D and the other $x'$ being mounted on a shaft E. They are also adapted to move in their casing C', in which they are movably incased. They are caused to revolve by the pressure of oil against their outside spurs or wings $h\ h\ h$. This outside casing C is provided with two pipes $c$ and $c'$, communicating with the interior of the casing C at opposite sides of the wheels $x$ and $x'$, and operate as inlet or outlet pipes, respectively, according as the wheels $x$ and $x'$ are desired to be run in the one or the other direction. If it is desired to run them in the direction of the arrows, $c$ will be the inlet-pipe and $c'$ the outlet-pipe. If it is desired to run them in the opposite direction, $c'$ will be the inlet-pipe and $c$ will be the outlet-pipe. If it is not desired to run the wheels $x$ and $x'$ in opposite or reverse directions, the pipe $c$ will be connected with the pipe $b^2$ and will become one and the same with it, and the pipe $c'$ will communicate with the pipe $b'$ and will become one and the same with it, as seen in Fig. 1, and the reversing mechanism F will be dispensed with. In machinery, then, where it is desirable to run the power-receiving mechanism in opposite directions at different periods of time, or, in other words, reverse its motion at pleasure while the pump B is always running in the same direction, I provide it with a reversing mechanism F, which in the drawings is shown to consist of an outside shell or casing F' and an inside shell or casing $F^2$, having a chamber between them, and the inside casing adapted to on its inside close around a rotatable cylinder or plug-valve V. This cylinder or valve V is provided with an open passage-way through its center. This passage-way is designated by letter P, and its function is to allow the oil to pass through the valve.

On the circumference, at opposite portions, there are recesses R R'. The recess R is large enough to span the two port-holes T T', and when the valve is turned so as to enable the recess R to span said two ports it will furnish an open passage-way for the return-oil from the pump C through the chamber $C^3$ and out at the pipe $b^2$. R' is likewise large enough to span the port-holes $m$ and $m'$, and furnish an open passage for the return of the oil when the valve is turned in that direction. In this case the revolution of the wheels $x$ and $x'$ is reversed. The pipe $b'$ passes through the outside casing F', through the chamber $C^3$, through the walls of the inner casing $F^2$, and communicates with interior of the inside casing, and is always in open communication with the passage P of the valve V. The pipe $c$ is in open communication with the interior of the pump C and the inner casing $F^2$ at the port $m$, and the pipe $c'$ is in open communication with the interior of the pump C, and the interior of the inner casing $F^2$ at the port T. The inner casing $F^2$ is also supplied with a port $n$, which forms an open communication between the interior of the casing $F^2$ and the chamber $C^3$. The pipes $b$ and $b^2$ form an open communication with the interior of an oil-reservoir H, which is large enough to hold a sufficient amount of oil to supply any deficiency which may be caused by pressure on the body of oil. The reservoir H is also made large enough to allow the oil or other fluid to cool which has become heated by its action and passage through the pump.

O is a body of oil or other liquid and it fills all the chambers, pipes, and recesses of the mechanism either under pressure or in its natural condition.

From the foregoing description it is obvious that if the valve V is turned, as shown in the drawings, Fig. 2, and the wheels W W' are set in motion, the oil will be pumped in the direction of the arrows through the pump B, on through the pipe $b'$ into the reverser F, through the passage-way P into the port $m$, through the pipe $c$, into the pump C, through the chamber between the wheels and outside casing C', out at the pipe $c'$, through the ports T and T' into the chamber $C^3$, and out at the pipe $b^2$ into the chamber H, and back through the pipe $b$ in the direction of the arrows. This current thus produced by the forcible revolution of the shaft A will cause the wheels $x$ and $x'$ to revolve in speed in proportion to their capacity to let the given volume of oil pass through the pump C. If it is desired to reverse the movement of the wheels $x$ and $x'$, the valve $v$ is thrown over, so that the passage P meets the port T, and the recess R' spans the ports $m$ and $m'$, and the direction of the oil through the pump C is reversed, and the wheels $x$ and $x'$ run in a reverse direction from the course indicated by the arrows. If it is desired that the power-receiving mechanism C should be stopped, the valve V is turned through half of its arc, so that the passage P meets the port $n$ and the oil will cease to flow through the pump C, notwithstanding the pump B continues to act. It is obvious that this reversing device is but an adjunct of my real invention, and may be dispensed with without departing from the spirit of the same. When the reversing device is dispensed with, the mechanism will be as shown in Fig. 1.

I claim—

1. In a mechanical movement, a pumping or fluid-actuating device, adapted to actuate a body of oil or other fluid and keep it in motion, a power-receiving device connected interiorly with said fluid-actuating device, whereby a path for said fluid is formed through the two devices, and a reversing mechanism situated between said fluid-actuating device and said power-receiving device and adapted to reverse the course of the fluid through either the power-receiving device or the fluid-actuating device, for the purposes set forth.

2. In a mechanical movement, the combination of a pumping or fluid-actuating device adapted to actuate a body of oil or other fluid and keep it in motion, a power-receiving device connected interiorly with said fluid-actuating device, whereby a path for said fluid is formed through the two devices, and a reservoir interposed in the path of the fluid on its return from the power-receiving device to the power-actuating device and interiorly connected with said two devices, substantially as described, and for the purposes set forth.

CHARLES K. PICKLES.

Witnesses:
WM. M. ECCLES,
R. R. SWEET.